US008428336B2

(12) United States Patent
Ikeda et al.

(10) Patent No.: US 8,428,336 B2
(45) Date of Patent: Apr. 23, 2013

(54) INSPECTING METHOD, INSPECTING SYSTEM, AND METHOD FOR MANUFACTURING ELECTRONIC DEVICES

(75) Inventors: Yoko Ikeda, Yokohama (JP); Junko Konishi, Yokohama (JP); Hisafumi Iwata, Hayama-machi (JP); Yuji Takagi, Kamakura (JP); Kenji Obara, Yokohama (JP); Ryo Nakagaki, Kawasaki (JP); Seiji Isogai, Hitachinaka (JP); Yasuhiko Ozawa, Abiko (JP)

(73) Assignee: Hitachi, Ltd., Tokyo (JP)

( * ) Notice: Subject to any disclaimer, the term of this patent is extended or adjusted under 35 U.S.C. 154(b) by 1178 days.

(21) Appl. No.: 11/431,709

(22) Filed: May 11, 2006

(65) Prior Publication Data

US 2006/0274932 A1    Dec. 7, 2006

Related U.S. Application Data

(63) Continuation of application No. 09/452,149, filed on Dec. 1, 1999, now Pat. No. 7,068,834.

(30) Foreign Application Priority Data

Dec. 1, 1998 (JP) .................................. P10-341991

(51) Int. Cl.
*G06K 9/00* (2006.01)

(52) U.S. Cl.
USPC ............................. 382/144; 382/145; 382/147

(58) Field of Classification Search .................. 382/144, 382/145, 147; 438/16, 401, 462, 800; 716/2, 716/19, 20, 21; 356/237.4, 237.5, 394; 430/4, 430/5, 30; 700/96, 97, 105, 120, 121; 348/86, 348/87, 125, 126
See application file for complete search history.

(56) References Cited

U.S. PATENT DOCUMENTS

| 5,371,778 | A | * | 12/1994 | Yanof et al. ..................... 378/4 |
|---|---|---|---|---|
| 5,586,239 | A | | 12/1996 | Ueda |
| 5,801,965 | A | | 9/1998 | Takagi et al. |
| 5,995,087 | A | | 11/1999 | Tanaka |
| 5,999,003 | A | | 12/1999 | Steffan et al. |
| 6,177,287 | B1 | | 1/2001 | Steffan et al. |
| 6,182,069 | B1 | | 1/2001 | Niblack et al. |
| 6,212,527 | B1 | | 4/2001 | Gustman |

(Continued)

FOREIGN PATENT DOCUMENTS

JP     07201946     8/1995

OTHER PUBLICATIONS

Semiconductor World, Aug. 1996, pp. 88, 99 and 102.

*Primary Examiner* — Brian Le
(74) *Attorney, Agent, or Firm* — Antonelli, Terry, Stout & Kraus, LLP.

(57) ABSTRACT

A method for classifying defects, including: calculating feature quantifies of defect image which is obtained by imaging a defect on a sample; classifying the defect image into a classified category by using information on the calculated feature quantities; displaying the classified defect image in a region on a display screen which is defined to the classified category; adding information on the classified category to the displayed defect image; transferring the displayed defect image which is added the information on the classified category to one of the other categories and displaying the transferred defect image in a region on the display screen which is defined to the one of the other categories; and changing information on the category.

13 Claims, 16 Drawing Sheets

U.S. PATENT DOCUMENTS 6,315,569 B1 11/2001 Zaltman
6,360,005 B1 3/2002 Aloni et al.
6,421,122 B2 7/2002 Nara et al.
6,526,162 B2 * 2/2003 Asano et al. .................. 382/128
2001/0040991 A1 * 11/2001 Asano et al. .................. 382/128

* cited by examiner

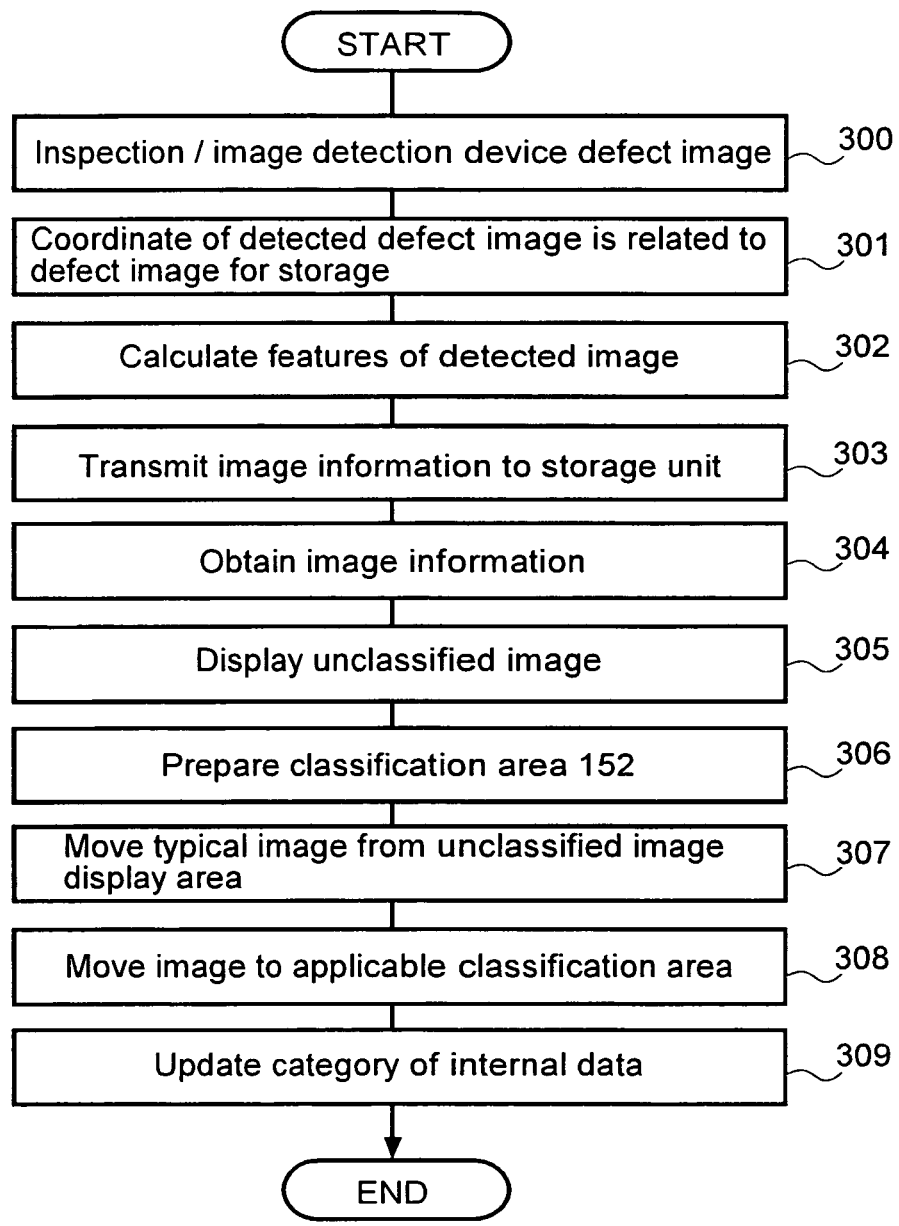

FIG.4

| Defect number | Coordinate X | Coordinate Y | Classification category | Operating data and time | Image name | Features |
|---|---|---|---|---|---|---|
| 00001 | 10 | 10 | Unclassified | 0000/00/00 00:00:00 | IMG001 | 000,0030,00 |
| 00002 | 10 | 30 | Unclassified | 0000/00/00 00:00:00 | IMG002 | 250,0030,00 |
| 00003 | 00 | 50 | Unclassified | 0000/00/00 00:00:00 | IMG003 | 000,0050,01 |
| 00004 | 00 | 70 | Unclassified | 0000/00/00 00:00:00 | IMG004 | 000,0700,00 |
| 00005 | 00 | 90 | Unclassified | 0000/00/00 00:00:00 | IMG005 | 000,0040,00 |
| 00006 | 50 | 10 | Unclassified | 0000/00/00 00:00:00 | IMG006 | 000,1000,00 |
| 00007 | 50 | 30 | Unclassified | 0000/00/00 00:00:00 | IMG007 | 000,0500,01 |
| 00008 | 50 | 50 | Unclassified | 0000/00/00 00:00:00 | IMG008 | 230,0050,00 |
| 00009 | 50 | 70 | Unclassified | 0000/00/00 00:00:00 | IMG009 | 245,0040,01 |
| 00010 | 50 | 90 | Unclassified | 0000/00/00 00:00:00 | IMG010 | 010,0035,00 |
| 00011 | 100 | 10 | Unclassified | 0000/00/00 00:00:00 | IMG011 | 005,0055,01 |
| 00012 | 100 | 30 | Unclassified | 0000/00/00 00:00:00 | IMG012 | 020,0060,00 |
| 00013 | 100 | 50 | Unclassified | 0000/00/00 00:00:00 | IMG013 | 200,0030,00 |
| 00014 | 100 | 70 | Unclassified | 0000/00/00 00:00:00 | IMG014 | 150,0300,01 |
| 00015 | 100 | 90 | Unclassified | 0000/00/00 00:00:00 | IMG015 | 190,0045,00 |
| 00016 | 150 | 10 | Unclassified | 0000/00/00 00:00:00 | IMG016 | 220,1200,00 |
| 00017 | 150 | 30 | Unclassified | 0000/00/00 00:00:00 | IMG017 | 000,0035,00 |
| 00018 | 150 | 50 | Unclassified | 0000/00/00 00:00:00 | IMG018 | 010,0045,00 |
| 00019 | 150 | 70 | Unclassified | 0000/00/00 00:00:00 | IMG019 | 150,0020,01 |
| 00020 | 150 | 90 | Unclassified | 0000/00/00 00:00:00 | IMG020 | 200,0035,00 |

601

602

(a)

(b)

| Category name | Area coordinate | Attached image |
|---|---|---|
| Unclassified | (000010,000020) (000150,000400) | IMG001,IMG002..... |
| White | (000160,000020) (000220,000100) | |
| | | |
| | | |

| Category name | Area coordinate | Attached image |
|---|---|---|
| Unclassified | (000010,000020) (000150,000400) | IMG002,IMG003..... |
| White | (000160,000020) (000220,000100) | IMG001 |
| | | |
| | | |

| Category name | Area coordinate | Attached image |
|---|---|---|
| Unclassified | (000010,000020) (000150,000400) | IMG002,IMG003..... |
| White | (000160,000020) (000220,000100) | IMG001,IMG005,IMG010 |
|  |  |  |
|  |  |  |

| Category name | Area coordinate | Attached image |
|---|---|---|
| Unclassified | (000010,000020) (000150,000400) | IMG006,IMG007..... |
| White | (000160,000020) (000220,000100) | IMG001,IMG005,IMG010 |
| Black | (000160,000120) (000220,000200) | IMG002 |
| Elongated | (000160,000220) (000220,000300) | IMG003 |
| Large | (000160,000320) (000220,000400) | IMG004 |

FIG.11

| Defect number | Coordinate X | Coordinate Y | Classification category | Operating data and time | Image name | Features |
|---|---|---|---|---|---|---|
| 00001 | 10 | 10 | White | 1997/01/01 00:00:01 | IMG001 | 000,0030,00 |
| 00002 | 10 | 30 | Black | 1997/01/01 00:00:02 | IMG002 | 250,0030,00 |
| 00003 | 10 | 50 | Elongated | 1997/01/01 00:00:03 | IMG003 | 000,0050,01 |
| 00004 | 10 | 70 | Large | 1997/01/01 00:00:04 | IMG004 | 000,0700,00 |
| 00005 | 10 | 90 | White | 1997/01/01 00:00:05 | IMG005 | 000,0040,00 |
| 00006 | 50 | 10 | Large | 1997/01/01 00:00:06 | IMG006 | 000,1000,00 |
| 00007 | 50 | 30 | Elongated | 1997/01/01 00:00:07 | IMG007 | 000,0500,01 |
| 00008 | 50 | 50 | Black | 1997/01/01 00:00:08 | IMG008 | 230,0050,00 |
| 00009 | 50 | 70 | Elongated | 1997/01/01 00:00:09 | IMG009 | 245,0040,01 |
| 00010 | 50 | 90 | White | 1997/01/01 00:00:10 | IMG010 | 010,0035,00 |
| 00011 | 100 | 10 | Elongated | 1997/01/01 00:00:11 | IMG011 | 005,0055,01 |
| 00012 | 100 | 30 | White | 1997/01/01 00:00:12 | IMG012 | 020,0060,00 |
| 00013 | 100 | 50 | Black | 1997/01/01 00:00:13 | IMG013 | 200,0030,00 |
| 00014 | 100 | 70 | Large | 1997/01/01 00:00:14 | IMG014 | 150,0300,01 |
| 00015 | 100 | 90 | Black | 1997/01/01 00:00:15 | IMG015 | 190,0045,00 |
| 00016 | 150 | 10 | Black | 1997/01/01 00:00:16 | IMG016 | 220,1200,00 |
| 00017 | 150 | 30 | White | 1997/01/01 00:00:17 | IMG017 | 000,0035,00 |
| 00018 | 150 | 50 | White | 1997/01/01 00:00:18 | IMG018 | 010,0045,00 |
| 00019 | 150 | 70 | Elongated | 1997/01/01 00:00:19 | IMG019 | 150,0020,01 |
| 00020 | 150 | 90 | Black | 1997/01/01 00:00:20 | IMG020 | 200,0035,00 |

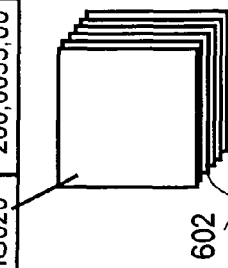

602

152  153  154  155

INSPECTING METHOD, INSPECTING SYSTEM, AND METHOD FOR MANUFACTURING ELECTRONIC DEVICES

CROSS REFERENCE TO RELATED APPLICATION

This is a continuation of U.S. application Ser. No. 09/452,149, filed Dec. 1, 1999 now U.S. Pat. No. 7,068,834. This application relates to and claims priority from Japanese Patent Application No. 10-341991, filed on Dec. 1, 1998. The entirety of the contents and subject matter of all of the above is incorporated herein by reference.

BACKGROUND OF THE INVENTION

The present invention relates to an analyzing unit, an inspecting system and a manufacturing method using the inspecting system, which are applied to a production line used in the manufacture of electronic devices and the like; and, more particularly, the invention relate to an analyzing unit, an inspecting system and a manufacturing method using the inspecting system, which efficiently classify images obtained as a result of inspection of devices being manufactured, to thereby shorten the analysis time required to detect a failure on the production line and to enable enhancement of manufacturing efficiency and a rapid yield ramp-up.

An electronic device, typically a semiconductor, is formed by repeating a plurality of processing steps, including exposure, development, etching and the like, on a wafer substrate. On the other hand, in certain ones of the plurality of processing steps, information indicating the position, size, number, category, etc. of foreign matter which has adhered to the wafer, as well as appearance failures, and information indicating the processing dimensions of workpiece (hereinafter generally referred to as defects) are collected by a foreign matter inspecting apparatus, an optical visual inspection apparatus, and an inspecting apparatus, such as a SEM, if necessary. In Monthly Publication, "Semiconductor World", 1996.8, pp 88, 99 and 102, it is indicated that all of the inspecting data are normally sent from the inspecting apparatus to an analyzing system through a network for control and analysis of the production.

Further, in the plurality of processing steps, an electronic microscope or the like is used to specify the cause of an occurrence of defects to obtain a defect image and perform a classifying operation on the basis of the shapes and sizes of the actual defects. This classifying operation is carried out visually on the screen of a personal computer or the like, whereby defect images are sampled on the basis of the size, the shape and the like of the defects, and then the defects are classified into groups of similar defects. It is noted that for the defects to be sampled, several numbers of defects per wafer are manually determined, referring to the distribution of defects as a wafer map. Recently, several hundreds of defect images per hour have been automatically obtained by an automatic defect review (ADR) of defect images. Anyway, the number of image samples being handled has tended to increase.

SUMMARY OF THE INVENTION

However, the user interface (image display) used in the classifying operation has not been sufficiently considered. Therefore, with the conventional system, it is difficult to efficiently classify a number of detected images, thereby not only requiring an extensive time for the classifying operation, but the analysis accuracy also tends to be too low. The number of images detected in the future is expected to increase, and so it is important to enhance the convenience of use of the classifying operation and to shorten the time needed for the classifying operation. Further, there is a possibility that the retirement of long time periods for the classifying operation will result in a delay in a feedback operation and a great hindrance to the yield of the production line.

It is an object of the present invention to shorten the analysis time and enhance the analysis accuracy by improving the user interface. It is a further object of the present invention to enhance the yield of the production line.

For achieving the aforementioned objects, according to the present invention, there is provided an inspecting system comprising an analyzing unit, said analyzing unit including an image detection device for photographing a plurality of images of a workpiece; a storage means for storing images produced by said image detection device; and a display means having a first area for displaying a plurality of the images that are stored in said memory means and a plurality of second areas for classifying said detected images according to features of said detected images; wherein said plurality of detected images can be moved on a screen from said first area to corresponding second areas to classify said plurality of detected images in said second areas.

Further, there is provided an analyzing unit comprising a storage means for storing a plurality of detected images; and a display means having a first area for displaying a detected image that is stored in said storage means and a plurality of second areas for classifying said detected images according to features of said detected images; wherein said plurality of detected images can be moved on a screen from said first area to corresponding second areas to classify said plurality of detected images in said second areas.

Further, there is provided a method of manufacturing an electronic device wherein use is made of a manufacturing apparatus for processing a workpiece to form an electronic device; an inspecting apparatus for inspecting the workpiece processed by said manufacturing apparatus; and an analyzing unit including an image detection device capable of photographing an image of said workpiece, a storage means for storing images provided by said image detection device, and a display means having a first area for displaying an image that is stored in said storage means and a plurality of second areas for classifying said images according to features of said images, whereby said plurality of images can be moved on a screen from said first area to corresponding second areas to classify said plurality of images in said second areas; wherein the production line having said manufacturing apparatus arranged thereon is controlled using information obtained from said analyzing unit to process the workpiece.

BRIEF DESCRIPTION OF THE DRAWINGS

FIG. 3 is a processing flow diagram showing one embodiment of an inspecting method in accordance with the present invention;

FIG. 4 is a diagram showing an example a data format created before classification in accordance with the present invention;

FIG. 11 is diagram showing an example of the data format as it exists after classification is completed;

DESCRIPTION OF THE PREFERRED EMBODIMENTS

Embodiments of the present invention will now be described in detail with reference to the accompanying drawings.

Figure 1:
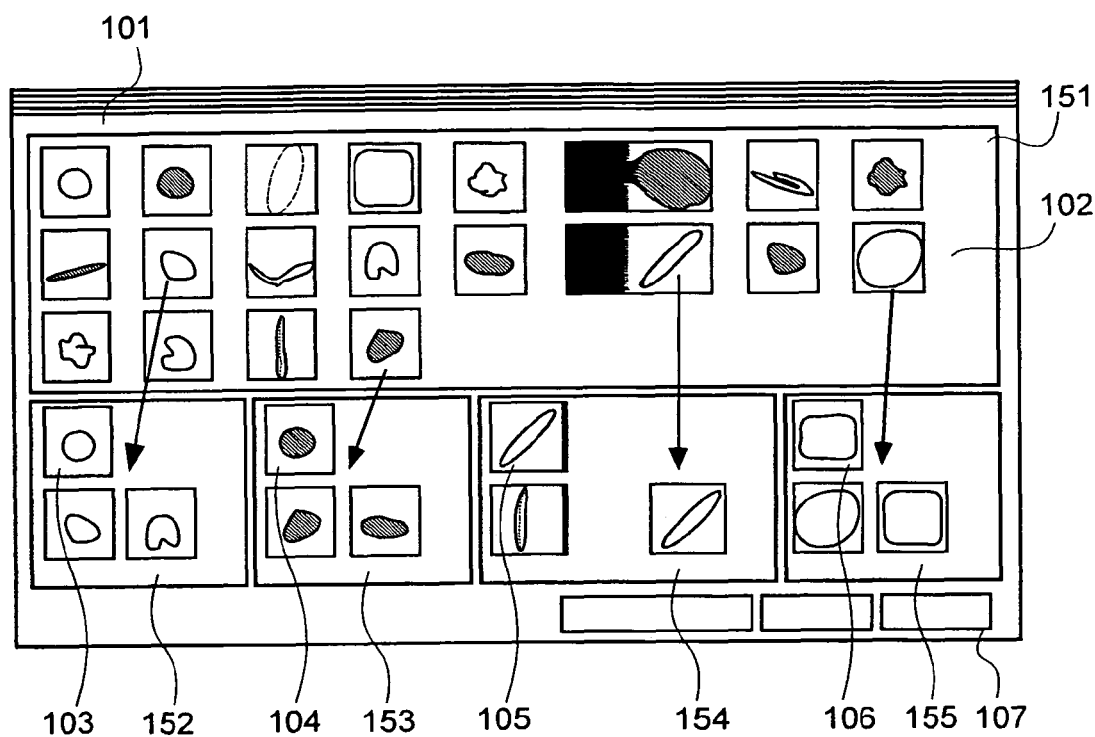
FIG. 1 is a diagram showing a defect image display which is capable of a classification function according to one embodiment of the present invention.

FIG. 1 is a view showing an example of a display illustrating a classification function performed on detected defect images on a PC (Personal Computer) display screen equipped with an analyzing unit. In the figure, reference numeral 101 designates a display screen of a PC. Numeral 151 designates an unclassified image display area for displaying detected defect images which have not been subjected to a classification operation. Numeral 102 designates detected individual defect images displayed in the unclassified image display area 151. Numerals 152 to 155 designate classification areas for classifying defect images. Numerals 103 to 106 designate typical defect images having features assigned to the classification areas 152 to 155, respectively. For example, a typical defect image 103 having a white and round defect feature is displayed in area 152, a typical black and round defect image 104 is displayed in area 153, an elongated defect image 105 is displayed in area 154, and a large defect image 106 is displayed in area 155. Numeral 107 designates a processing button for executing a preassigned function.

As will be understood from FIG. 1, the present embodiment is designed so that a plurality of classification areas for classifying defect images are provided on a screen, and typical images and classified images are both displayed on the screen in these areas. Therefore, in the case where a plurality of detected defect images are to be classified, even if a number of defect images having complicated shapes are displayed, a user need only move the individual defect images to an optimal classification area having a typical image indicative of similar visual features in order to carry out the classification operation easily and quickly. In particular, since the classification operation can be carried out by a drag and drop operation using a mouse or the like on the screen, the classification operation can be carried out while looking at all the defect images on the display screen, with the result that the classification operation can be performed while relatively comparing all the defect images, and so its operativeness is excellent. The details of this operation will be described later.

Figure 2:
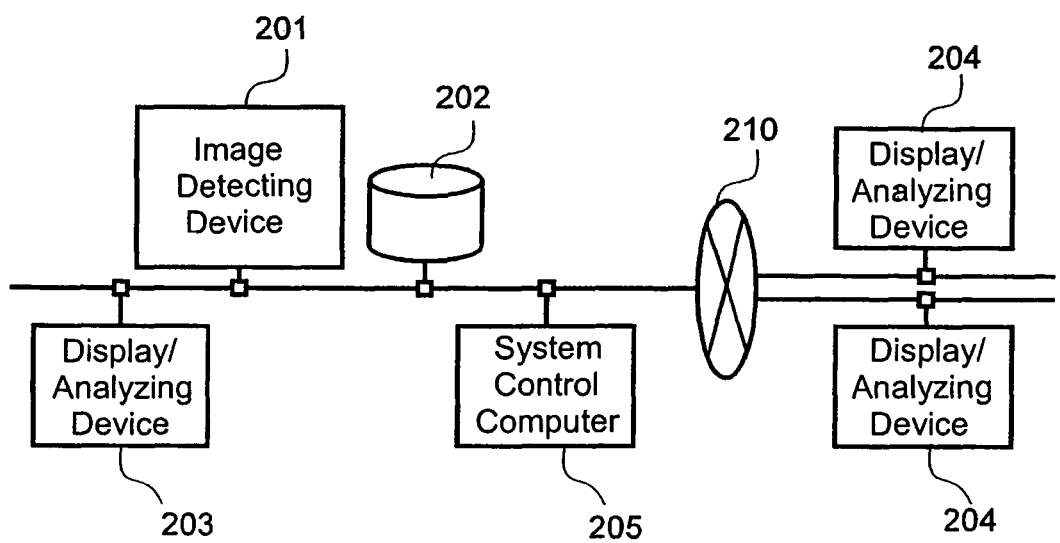
FIG. 2 is a block diagram showing an inspecting system according to one embodiment of the present invention.

FIG. 2 is a block diagram showing one example of a system for realizing the present invention. In this figure, the system comprises an image detecting device 201; a storage unit 202; display/analyzing devices 203 and 204; a system control computer 205; and a network 201, such as LAN in a factory. The storage unit 202 either may be connected to an image detecting device, or it may be connected to a separate apparatus on the network, for example, the image detecting device 201. It is noted that the display/analyzing function as shown in FIG. 1 can be incorporated in the image detecting device 201, or be included as a function of the computer connected to the image detecting device 201, or be incorporated in the display/analyzing device 204 in an office or the like physically located distant therefrom; however, in the present embodiment, the function thereof is provided in the display/analyzing device 203. A plurality of image detecting devices 201 may be provided, though they are not shown, in which case the system control computer 205 is able to distribute a feature so that it is set and adjusted to each image detecting device 201. Thereby, in the classification performed at each image detecting device 201, the features can be standardized. The setting and adjustment of the features will be described later.

FIG. 3 is a diagram showing the processing flow of the operation of the inspection system shown in FIG. 2.

First, the image detecting device 201 detects one hundred to three hundred defect images in a single wafer (Step 300). The detected defect images are temporarily stored in a memory of the image detecting device 201 with a defect location coordinate corresponding to the location of the defect on the wafer (Step 301).

Next, the image detecting device 201 calculates the features of the detected images stored in the memory (Step 302). For example, it calculates numerical values for the size, color, shape and the like of the detected images.

When the features of the detected images are calculated, a data format as shown in FIG. 4 is generated, which data is transmitted to the storage unit 202 (Step 303). The data format shown in FIG. 4 is constituted so that the coordinate of the defects, the date and time of operation, the name of the corresponding detected image, the features, and the classification categories showing information in the case where the detected images are classified can be described. In this case, since the classification operation has not yet been carried out on the detected images, information indicating non-classification is described in the classification category. Alternatively, the data format may be constituted so that inspection results of detected images or the like are directly transmitted to the storage unit 202, and the storage unit 202 carries out a calculation of the features and production of the data format. Further, alternatively, the data format may be constituted so that the image detecting device 201 also carries out the calculation of features of the detected images.

In this manner, image information, which includes such information as the image itself, the position, the detecting condition, the feature and the category, collected for every wafer, are sequentially stored in the storage unit 202.

Now, in the case where a user carries out the classification of the image information, first, the display/analyzing device 203 obtains the image information shown in FIG. 4 from the storage unit 202 (Step 304). For example, identification information, such as wafer numbers of wafers to be subjected to the classification operation, is input into the display/analyzing device 203, and corresponding image information is obtained from the storage unit 202.

Figure 5:
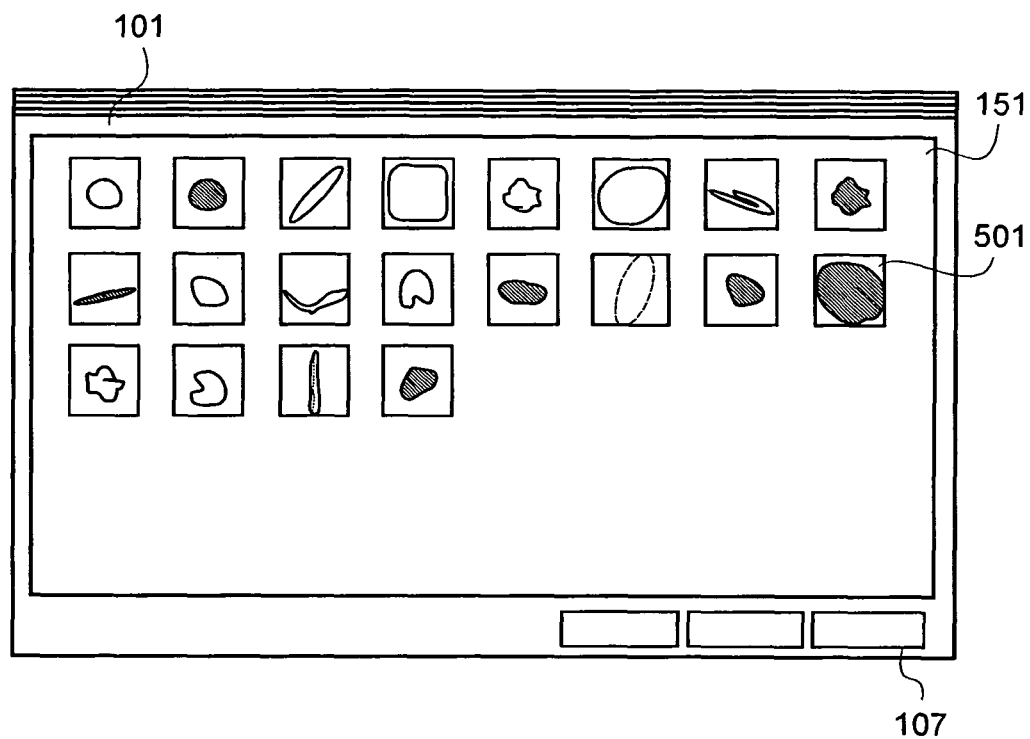
FIG. 5 is a diagram showing an example of a display screen as it appears before classification in accordance with the present invention.

The display/analyzing device 203, which has obtained the image information, displays the detected defect images on the unclassified image display area 151 (Step 305). FIG. 5 shows an example of such a display, in which twenty defect images having various shapes, sizes, and colors are displayed.

Figure 6:
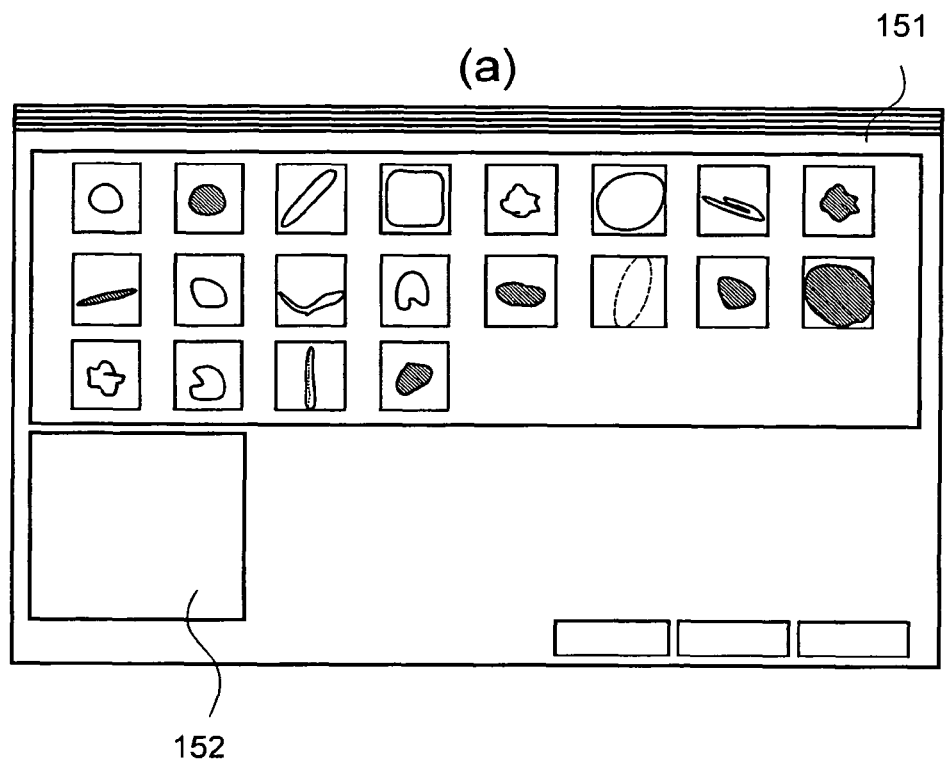
FIGS. 6(a) and 6(b) are diagrams showing a display screen as it appears during a step of the classification and a data format related thereto, respectively, in accordance with the present invention.

Next, there is prepared on the display screen a classification area 152 for classifying defect images, as shown in FIG. 6(a) (Step 306). For this purpose, a classification area displayed on the display screen is related to a category of the area as shown in FIG. 6 (b) That is to say, each area in the display screen is characterized, and a category (features) related as in FIG. 6(b) is imparted to the defect image classified into each respective area. In FIG. 6(b), the fact that the category is white is imparted to defect images positioned at area coordinates (000160,000020) (000220,000100) of the classification area 152. However, in FIG. 6(b), since the defect images have not yet been moved on the display screen from the unclassified image display area 151 to the classification area 152 on the display screen, attached image names are not described in the column applicable to the classification area 152. Further, the fact that the category is unclassified is imparted to defect images positioned inside the coordinates (000010,000020) (000150,000400) of the unclassified image display area 151. Accordingly, in FIGS. 6 (a) and 6 (b), all the defect images are described as being unclassified. Area attribute information shown in FIG. 6(b) is information stored within the display/analyzing device 203. Further, information of an attached image shown in FIG. 6(b) is not always necessary, but it will suffice that at least the classification area and the attribute (category) of the area are recognized.

Figure 7:
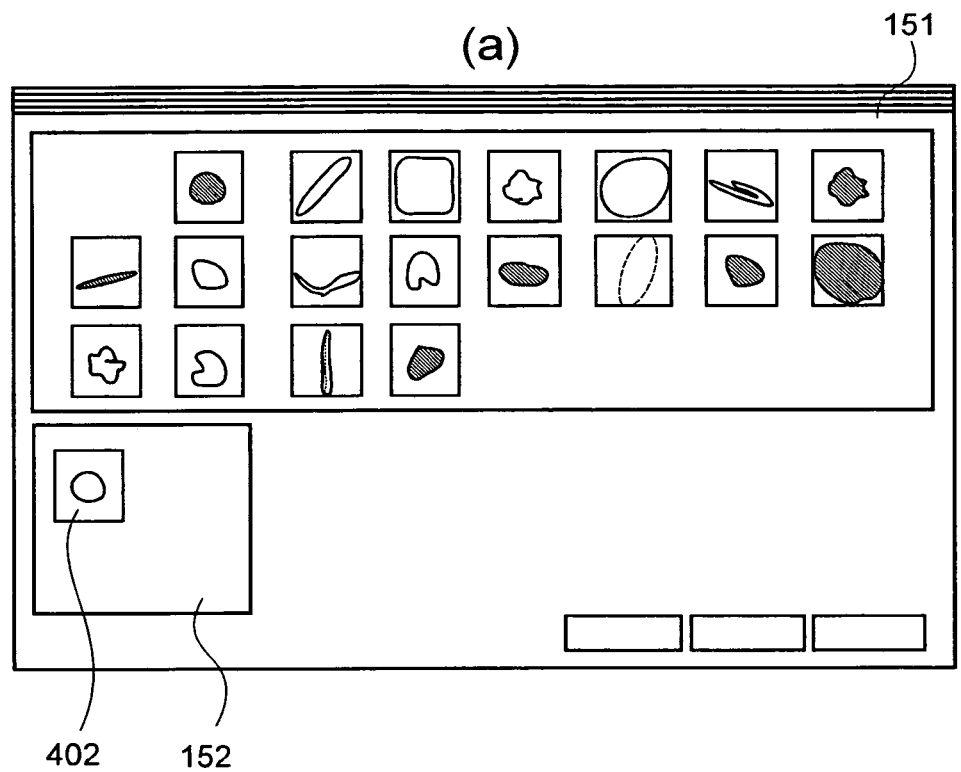
FIGS. 7(a) and 7(b) are diagrams showing a display screen as it appears during a further step of the classification and the data format related thereto, respectively.

Next, a defect image 402 which is to be indicative of the characteristic of the classification area 152 is moved from the unclassified image display area 151 to serve as a typical defect image for the classification area 152, as shown in FIG. 7(a) (Step 307). For example, a typical defect image 402 present in the unit classified image display area 151 is clicked by a mouse and moved to the classification area 152 by a drag and drop operation. In this case, in the area category information shown in FIG. 7(b), a moved defect image IMG001 is described in the column of the area coordinates (000160, 000020) (000220,000100), as category"white" Alternatively, it is possible that the actual defect image is not moved from the unclassified image display area 151, but that a schematic image is displayed instead. In this case, a plurality of schematic images as desired are produced in advance, and the thus produced images may be introduced as typical defect images in respective classification areas. Alternatively, also, the typical defect image or images need not be displayed on the respective classification areas, but text information representative of the features may be displayed.

Figure 8:
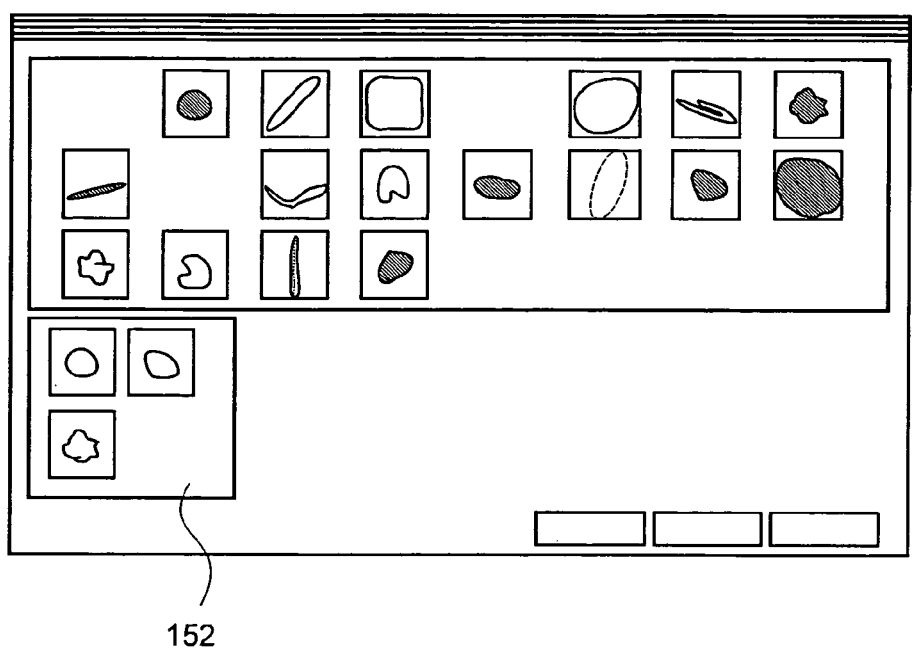
FIGS. 8(a) and 8(b) are diagrams showing a display screen as it appears during a further step of the classification and the data format related thereto, respectively.

Then, other unclassified defect images similar to the typical defect image 402 are selected from the unclassified image display area 151 and transferred into the classification area 152, while referring to the typical defect image 402 displayed in the classification area 152 (Step 308). For example, an applicable defect image present in the unclassified image display area 151 is clicked by a mouse and moved to the classification area 152 by a drag and drop operation. In FIGS. 8(a) and 8(b), defect images IMG005 and IMG010, which are similar to the defect image IMG001, are classified.

Figure 9:
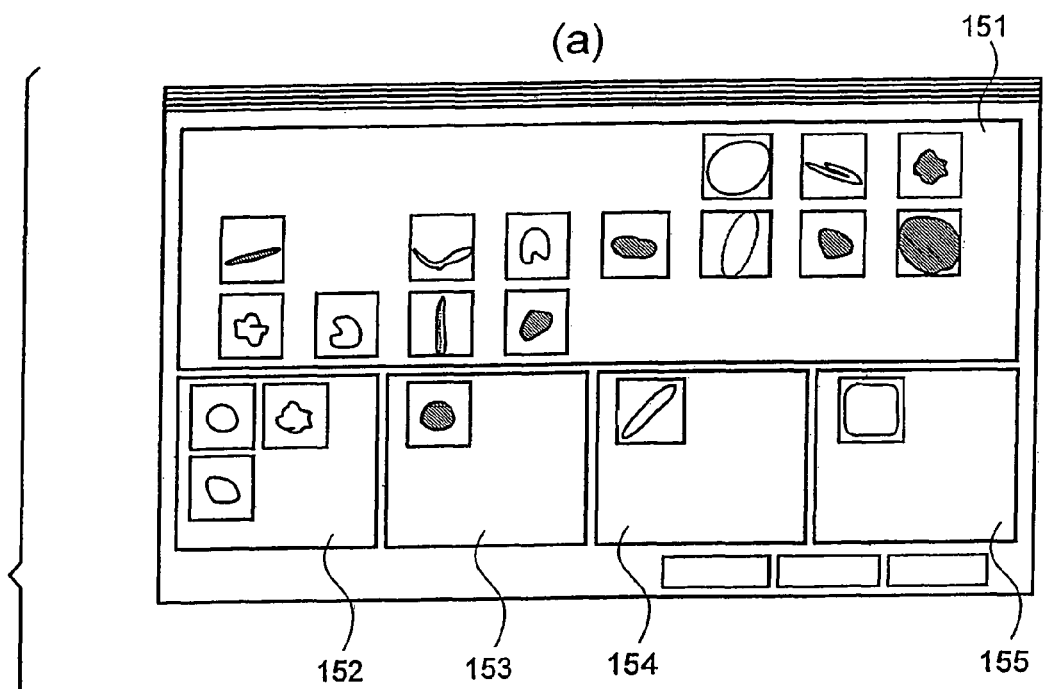
FIGS. 9(a) and 9(b) are diagrams showing a display screen as it appears during a further step of the classification and the data format related thereto, respectively.
Figure 10:
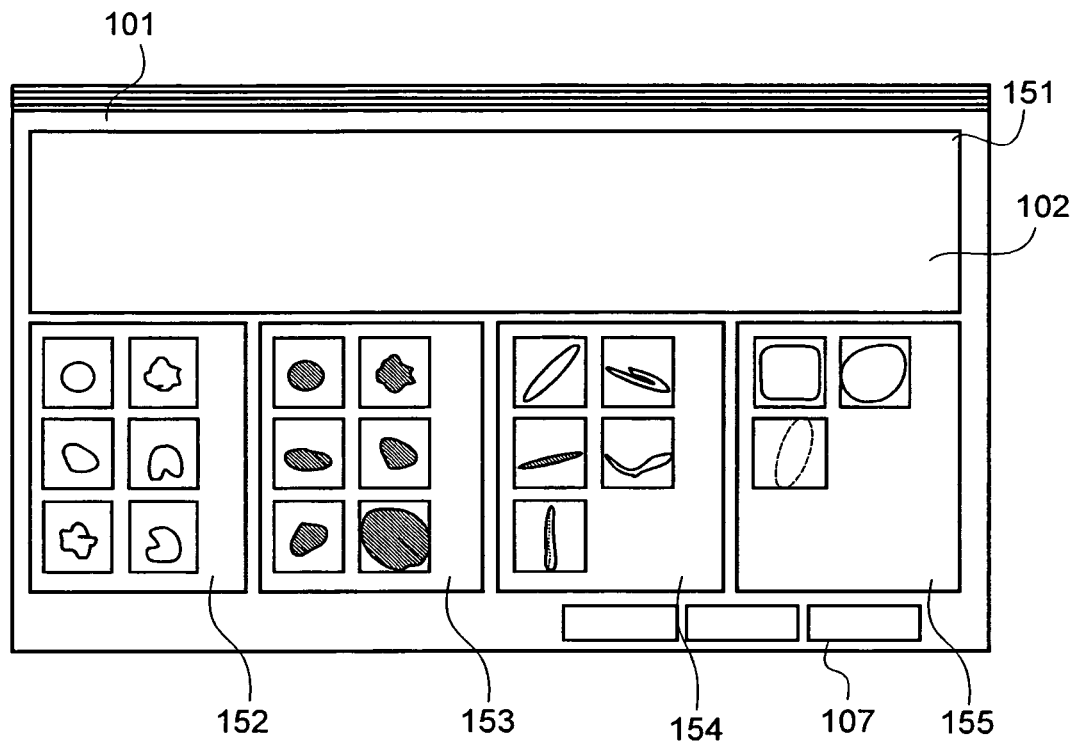
FIG. 10 is a diagram showing a display screen as it appears after completion classification in accordance with the present invention.

Similarly, the other classification areas 153, 154, 155 are defined, as shown in FIGS. 9(a) and 9(b), and unclassified defect images which are similar to a particular typical defect ima4e are classified from the unclassified image display area 151 to the classification areas 152, 153, 154, 155, whereby the classification operation with respect to all the defect images is carried out. FIG. 10 is a display screen showing the classification results. While in this case, four different classification areas were provided for the classification operation, it is noted that the contents and the number of the categories may be changed as necessary.

Next, a data format as shown in FIG. 11 is produced from the classified results shown in FIG. 10 (the data format shown in FIG. 4 is updated), and the data is transmitted from the display/analyzing device 203 to the storage unit 202 (Step 309). For example, corresponding attribute information is obtained from a position on the display screen on which the defect image is arranged on the basis of the area attribute information shown in FIG. 6( b) at a fixed timing after completion of the classification operation or during the classification operation, and the classification category shown in FIG. 11 is updated. Also, in this case, the classified result per wafer unit is transmitted.

Since, as described above, a classification area for classifying the defect images is provided on the screen, and a typical image is displayed on the screen, even when the detected defect images are classified, if a plurality of defect images having a complicated shape should be displayed, the user need merely move the defect images to the optimal classification area representing similar visual features, thus enabling execution of the classification operation easily and quickly. In particular, since the classification operation can be carried out on the screen by a drag and drop operation using a mouse, the classification operation can be carried out while looking at all the defect images on the display screen, and the classification operation can be performed while relatively comparing all the defect images to provide excellent selectivity and discrimination.

Figure 12:
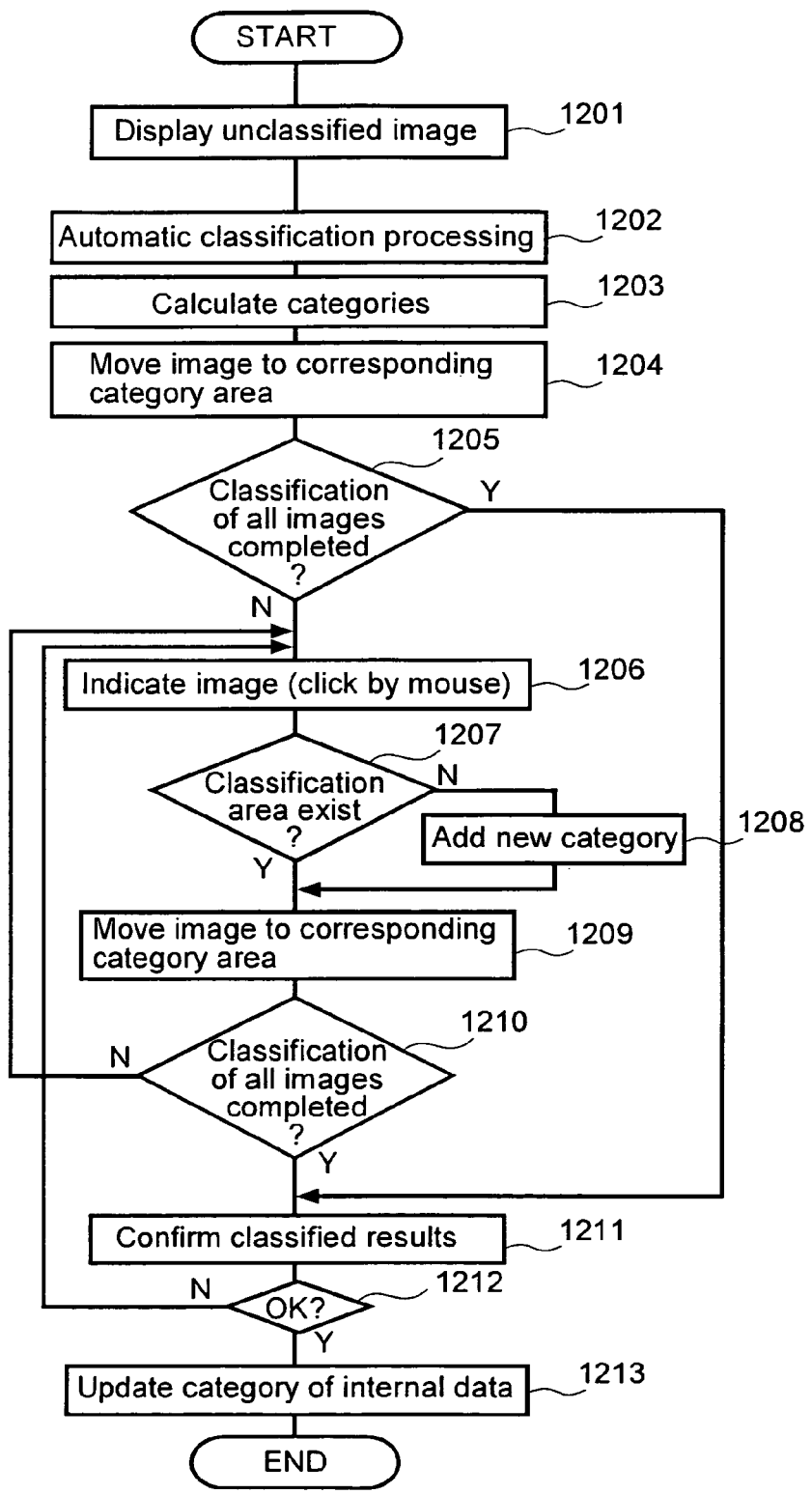
FIG. 12 is a processing flow chart showing a method of automatic classification according to the present invention.

Next, an example will be described in which unclassified defect images are automatically classified, and the classified results are corrected to classify the defect images. The automatic classification and the correcting function are combined so that the defect images are roughly automatically classified, after which a correction is added, whereby it is possible to shorten the operating time of the classification operation and to enhance the classification accuracy. FIG. 12 shows the processing flow for this method.

Figure 13:
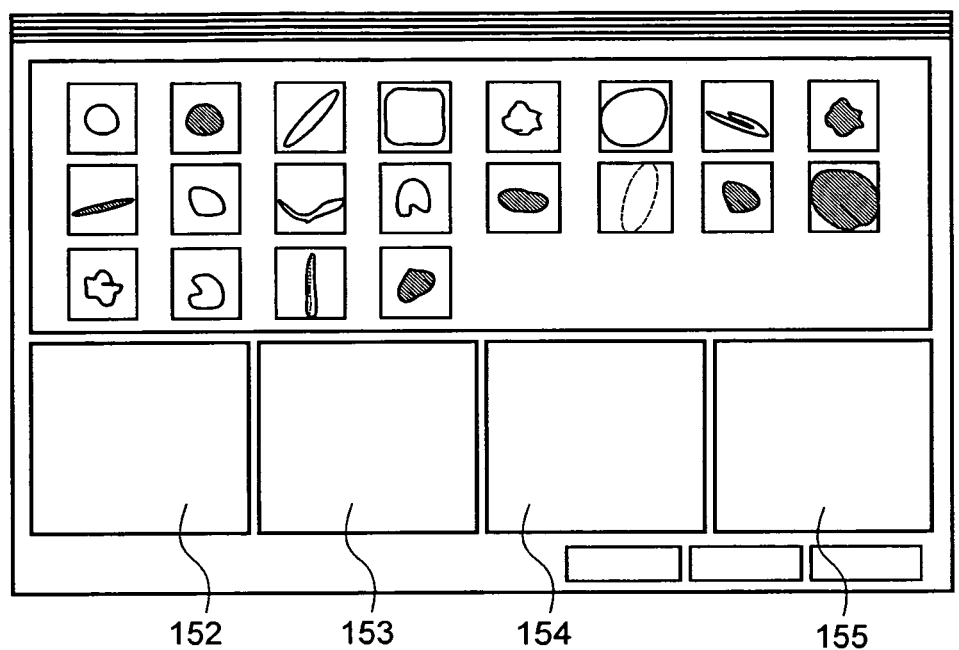
FIG. 13 is a diagram showing a display screen as it appears during classification in accordance with the automatic classification method.

A plurality of classification areas are preset for automatic classification. For example, classification areas 152 to 155 are prepared using a procedure similar to that described previously, as shown in FIG. 13. Also in this case, the classification areas displayed on the display screen are related to the attributes thereof. The area attribute information is stored in a display/analyzing device 203.

Figure 14:
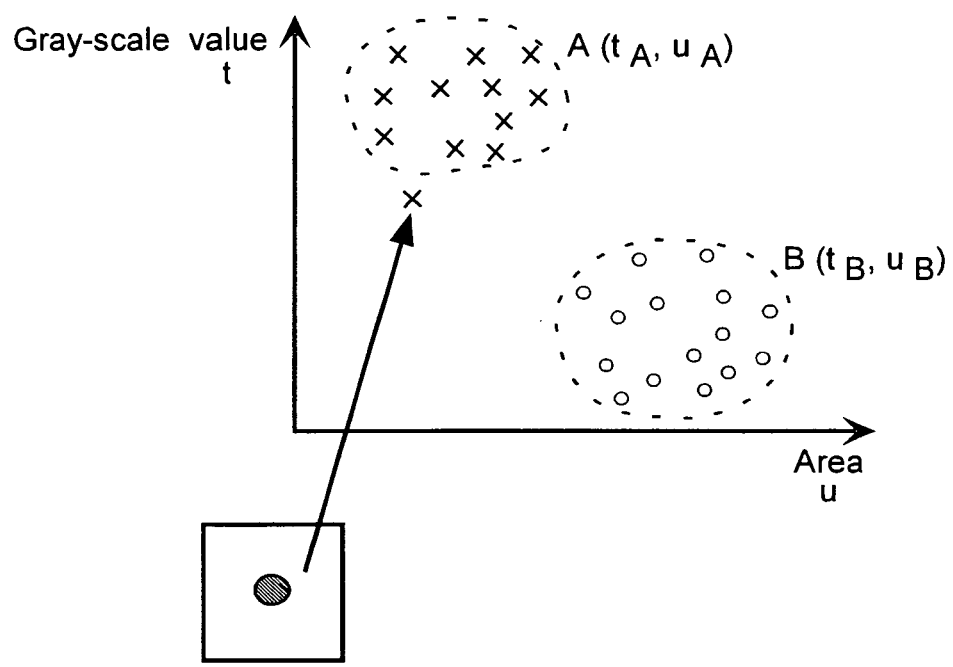
FIG. 14 is a diagram representative of functions used for automatic classification in accordance with the present invention.

Further, functions for automatic classification are stored in the display/analyzing device 203. This function is provided to calculate to which category the features of a particular defect image belongs. FIG. 14 is a diagram which schematically shows the functions. This diagram represents the function between an area of the defect image and the gray-scale value thereof and, on the basis of this function, a calculation is made to determine at which area the features of the defect image are positioned in the figure. For example, if the feature is positioned in a certain position relative to (tA, uA) as a center, the defect image thereof is calculated as a category A. While FIG. 14 shows a secondary function of the area and the gray-scale value, it is to be noted that other parameters may be used, or a multifunction, such as a cubic or quadratic function, may be used.

Next, the display/analyzing device 203 obtains the detected result shown in FIG. 4 from the storage unit 202 and displays the detected defect image on the unclassified image display area 151 (Step 1201) The processing up to the point where the display/analyzing device 203 displays the detected defect image on the unclassified image display area 151 is similar to that of the example previously mentioned, and so a repetition of the detailed description is omitted.

Next, the automatic classification starts on the def6ct image displayed on the unclassified image display area 151 (Step 1202). That is, a category in which the feature of each defect image falls is calculated on the basis of the function stored in the image detecting device 201 (Step 1203).

Figure 15:
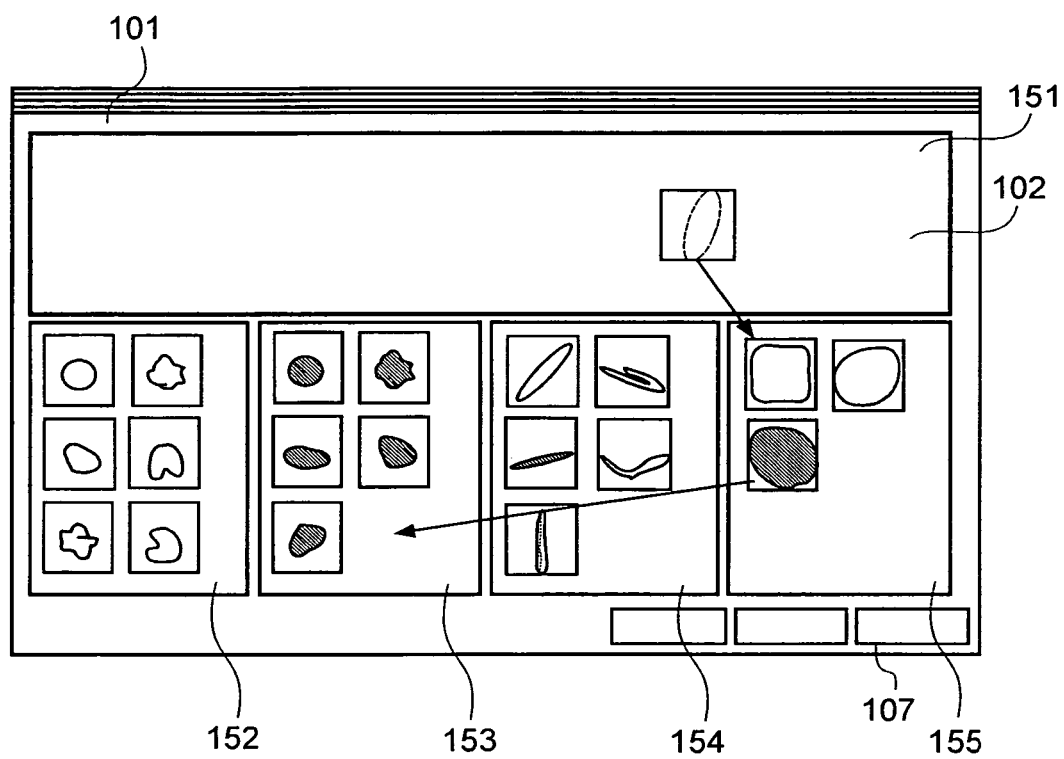
FIG. 15 is a diagram showing a display screen as it appears during classification in accordance with a connection of classification.

When the category is calculated, the defect image is moved to the corresponding classification area on the display screen on the basis of the aforementioned area attribute information (Step 1204). FIG. 15 is a view showing a display screen after such movement. With respect to a defect image that cannot be subjected to image processing according to the detected conditions leading to failure to obtain the necessary features, or a defect image which does not fall under any category, the defect image is moved from the unclassified area to a specific classification area manually in the manner described previously using a mouse or a keyboard for effecting the classification operation.

In the case where the classification for all the images is completed (Step 1205), the classified result is confirmed (Step 1211), and whether or not the classified result is to be corrected is judged by examination of the screen (Step 1212). The correction of the classified result is shown in FIG. 15. In FIG. 15, in the case where a defect image A is corrected in category by transferring it from a classification area 155 to a classification area 153, for example, the defect image A present in the classification area 155 is clicked by a mouse (Step 1206) and moved to the corresponding classification area 153 by a drag and drop operation, thus enabling easy correction of the classified result (Step 1209) Alternatively, in the case where no corresponding category is present, a category may be newly added (Step 1208).

The aforementioned processing is carried out on all the defect images to complete the classification operation (Step 1210). FIG. 10 shows a display screen showing the corrected result. When the classification operation is completed, the category information concerning the defect images is updated (Step 1213), and the updated result is transmitted to the storage unit 202. In the case where the automatic classification is not completed for all the defect images, that is, in the case where defect images that cannot be automatically classified are present (Step 1205), the procedure is shifted to the classification operation by way of manual classification, as shown in Steps 206 to 212.

Since, in this embodiment, the corresponding category information is also obtained from the position on the display screen on which defect images are arranged in accordance with the area attribute information stored in advance, the correction of a classification category for the defect image can be carried out easily. In other words, since the corresponding category information is obtained from the position on the display screen on which defect images are arranged, even if a correction or the like should occur, the user need merely move the defect image on the display screen, and the classification operation including the correction can be realized very easily, enhancing the convenience in use.

Finally, an example of analysis using the above-described classified results will be explained below.

Figure 16:
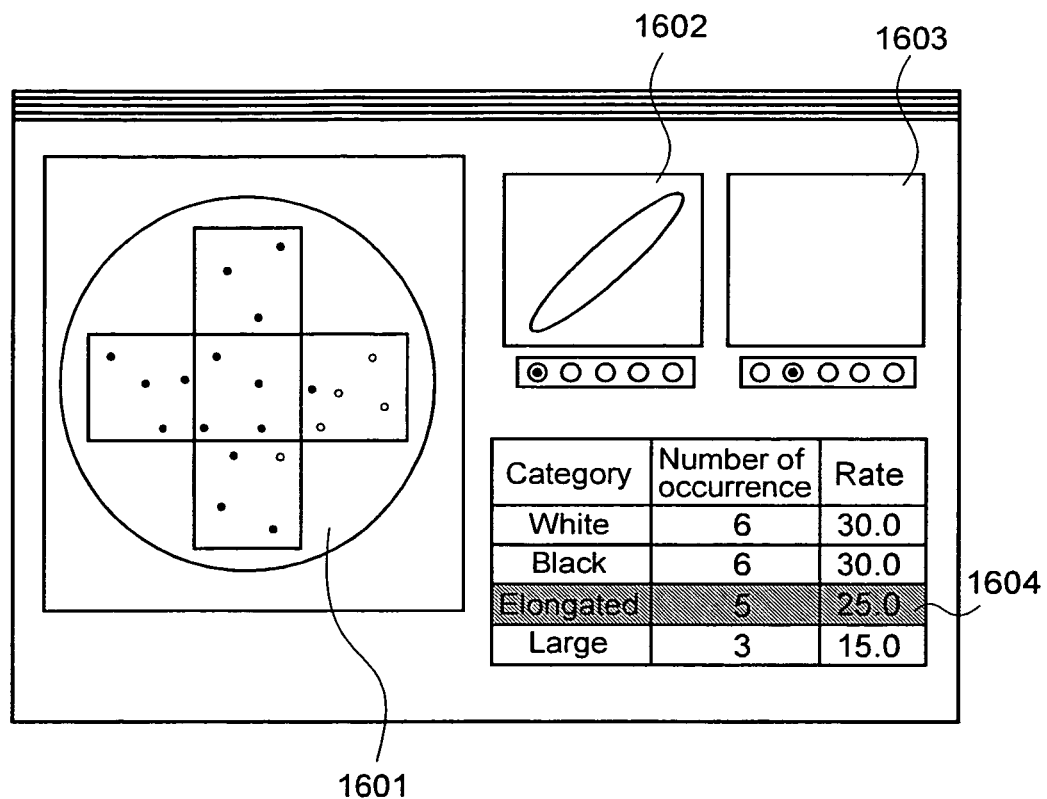
FIG. 16 is a diagram showing a defective classification result analyzing function in accordance with the present invention.

In analyzing the classified results, an applicable classified result is obtained from the storage unit 202 in the display/analyzing device 203. FIG. 16 shows one example of the analyzing screens thereof. Numeral 1601 designates a position of the detected defect image obtained from the classified results shown in FIG. 11, showing a defect distribution on the wafer. Numerals 1602 and 1603 designate the defect images on the wafer, the imaging conditions and the like. Numeral 1604 designates a classification result display area, in which the classified results relative to the applicable defect images are 6ollected on the spot to display the results thereof. For example, the number of occurrences and the rate of occurrence according to the categories are calculated from the classified results shown in FIG. 11 and are displayed.

Although not shown, as a further possibility, a specific category is selected whereby defects on a wafer with the category are shown in a recognizable way according to the colors thereof on the position 1601. Here, defects of applicable categories are extracted using the classified results shown in FIG. 11, and the positions of the defects on the wafer are extracted to enable the display of the positions in color as desired.

Although not shown, alternatively, the classified results may be displayed by a circular graph, a broken-line graph or a bar graph according to the categories. These displays may be output to separate windows or may be displayed simultaneously on a single window. Further, these displays may be printed out for the purpose of making reports, or data may be output to files or the like.

The cause of occurrence of the defects is investigated using a classified result such as described to measure the production line early in the manufacture of a device, thus enabling prevention of a lowering of the yield of the production line. Accordingly, it is possible to shorten the feedback time of the analyzed results to the production line, including the time needed for the classification operation, to prevent a lowering of the yield of the production line.

According to the present invention, the efficiency of the classification operation is realized by improving a user's interface, thus enabling a shortening of the analysis time and an enhancement of the analysis accuracy.

What is claimed is:

1. A computerized method for classifying defects, comprising:
    calculating feature quantities of a plurality of defect images which are obtained by imaging defects on a sample using an image detecting device;
    automatically classifying each of said defect images respectively into one of a plurality of categories based on a predetermined function, by using information on said calculated feature quantities;
    displaying all of said classified defect images, which have been automatically classified, respectively in different regions in each classified category based upon the calculated feature quantities of each of the defect images, wherein all of the defect images and all of the categories are simultaneously displayed on a same display screen with the defect images respectively grouped in different ones of the categories based upon the calculated feature quantities for each defect;
    in the event of a need to reclassify one of the defect images, moving said one defect image from a previously classified category to another classified category to correct the category of the moved defect image; and associating classified category information of said another classified category with data of said displayed moved defect image.

2. A computerized method for classifying defects according to the claim 1, wherein said same display screen is screen of a PC, and said moving of said one defect image is effected by a drag and drop operation by a mouse of said PC, on said same display screen.

3. A computerized method for classifying defects according to the claim 1, wherein in the calculating, said feature quantities includes a size, color and shape of said defect image.

4. A computerized method according to claim 1, wherein said predetermined function classifies each of the defect images based on at least one of gray scale value, shape and size of the defect image.

5. A computerized method for classifying defects, comprising:

displaying all of a plurality of classified defect images, which have been automatically classified, respectively in different regions in one of a plurality of classified categories based upon calculated feature quantities of each of the defect images, wherein all of the defect images and all of the categories are simultaneously displayed on a same display screen with the defect images respectively grouped in different ones of the categories based upon the calculated feature quantities for each defect, in the event of a need to reclassify one of the defect images, moving said one defect image from a previously classified category to another classified category to correct the category of the moved defect image; and associating classified category information of said another classified category with data of said displayed moved defect image.

6. A computerized method for classifying defects according to the claim 5, wherein said display screen is screen of a PC, and said moving of said one defect image is effected by a drag and drop operation by a mouse of said PC, on said same display screen.

7. A computerized method for classifying defects according to the claim 5, wherein said data of said displayed defect image includes features of said defect image which are not modified by moving said displayed defect image to said another category-region on the same display screen.

8. A computerized method for classifying defects according to the claim 7, wherein said data of said displayed defect image includes a size, color and shape of said defect image.

9. A computerized method according to claim 5, wherein said predetermined function classifies each of the defect images based on at least one of gray scale value, shape and size of the defect image.

10. An apparatus for classifying defects, comprising:

a feature calculating unit which is configured to calculate feature quantities of a plurality of defect images which are obtained by imaging defects on a sample using an image detecting device;

an automatic defect classifying unit configured to automatically classify each of said defect images respectively into one of a plurality of categories based on a predetermined function, by using information on said calculated feature quantities;

a display unit configured to display all of said classified defect images, which have been automatically classified, respectively in different regions in each classified category based upon the calculated feature quantities of each of the defect images, wherein all of the defect images and all of the categories are simultaneously displayed on a same display screen with the defect images respectively grouped in different ones of the categories based upon the calculated feature quantities for each defect;

a moving unit which, in the event of a need to reclassify one of the defect images, is configured to move said one defect image from a previously classified category to another classified category to correct the category of the moved defect image; and an associating unit to associate classified category information of said another classified category with data of said displayed moved defect image.

11. An apparatus for classifying defects according to the claim 10, wherein said display is a display of a PC, and said moving unit includes a mouse of said PC.

12. An apparatus for classifying defects according to the claim 10, further comprising a memory configured to store said calculated feature quantities including a size, color and shape of said defect image.

13. An apparatus according to claim 10, wherein said predetermined function classifies each of the defect images based on at least one of gray scale value, shape and size of the defect image.

* * * * *